(12) United States Patent  
Chng et al.

(10) Patent No.: US 12,524,275 B2  
(45) Date of Patent: Jan. 13, 2026

(54) OPERATING A DISTRIBUTED WORKER POOL TO CONSERVE COMPUTING RESOURCES

(71) Applicant: Zendesk, Inc., San Francisco, CA (US)

(72) Inventors: Zhi Wei Mervyn Chng, San Francisco, CA (US); Vatsal B. Sevak, Brentwood, CA (US); Joshua J. Teitelbaum, San Francisco, CA (US); Gary Steven Grossman, San Francisco, CA (US); Gabriel Martin-Dempesy, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 656 days.

(21) Appl. No.: 17/929,117

(22) Filed: Sep. 1, 2022

(65) Prior Publication Data

US 2024/0078136 A1    Mar. 7, 2024

(51) Int. Cl.
*G06F 9/46*      (2006.01)
*G06F 9/50*      (2006.01)

(52) U.S. Cl.
CPC .......... *G06F 9/5038* (2013.01); *G06F 9/5033* (2013.01); *G06F 9/5044* (2013.01)

(58) Field of Classification Search
CPC ..... G06F 9/5038; G06F 9/5033; G06F 9/5044
See application file for complete search history.

(56) References Cited

PUBLICATIONS

Allman M., "TCP Congestion Control", Network Working Group, RFC 5681, Purdue University, Sep. 2009.
Landau, Eran, "Performance Under Load", Netflix Technology blog, Mar. 23, 2018, retrieved from https://netflixtechblog.medium.com/performance-under-load-3e6fa9a60581.
Moore, Jon, "Stop Rate Limiting! Capacity Management Done Right", transcript for video of talk from Strangeloop Conference, Sep. 28-30, 2017, https://www.youtube.com/watch?v=m64SWI9bfvk.

*Primary Examiner* — Gregory A Kessler
(74) *Attorney, Agent, or Firm* — Dinsmore & Shohl LLP

(57) ABSTRACT

A system and method are provided for operating a pool of workers within a distributed computing system, wherein each of multiple computers host one or more workers. Each computer also hosts ledgers for one or more originators of tasks that are submitted to the pool for processing. A ledger identifies tasks from the corresponding originator that have been submitted to the pool and that have not yet been completed. When an originator submits a new task, the system (e.g., a coordinator) identifies a maximum number of concurrent tasks permitted the originator and determines, with reference to the originator's ledger, whether the task can be submitted to the pool without exceeding the limit. If so, the task is assigned to an idle worker (if any) and is added to the originator's ledger. After completion, the task is removed from the ledger. Obsolete or stale entries are periodically purged from originators' ledgers.

21 Claims, 4 Drawing Sheets

OPERATING A DISTRIBUTED WORKER POOL TO CONSERVE COMPUTING RESOURCES

BACKGROUND

This disclosure relates to the field of computer systems. More particularly, a system and methods are provided for conserving computing resources (e.g., processor cycles, data storage) by intelligently managing and adjusting a pool of automated worker entities (e.g., processes, threads) within a distributed computing system.

Some computing environments employ pools of worker entities that are assigned to new tasks as they arrive. For example, in an ETL (Extract, Transform, Load) pipeline, a worker entity may be assigned to a new task, complete all or a specified portion of the necessary processing, and then return to the pool when its work is complete. However, naïve assignment or allocation of worker entities to incoming tasks can result in unfairness, such as when one source of new tasks submits a large number of tasks that significantly or completely depletes the pool of available worker entities, thereby causing other task originators to be blocked from having their tasks completed in a timely manner. In addition, a statically sized pool may involve instantiation and maintenance of too many worker entities, thereby causing many to be idle, or too few worker entities, thereby causing tasks to be delayed.

SUMMARY

In some embodiments, systems and methods are provided for intelligently managing a pool of workers (or worker entities) for handling tasked computer operations within a distributed computing environment. More particularly, the assignment of workers to new tasks is managed to eliminate unfair allocation, and the size of the pool is monitored and automatically adjusted as necessary to avoid over- and under-allocation of resources.

In these embodiments, each originator of new tasks is limited in the number of workers that may be concurrently or simultaneously employed in working on the originator's tasks, or the number of tasks that may be in process at one time. One or more queues or other data structures are used to store tasks that must wait for an available worker entity. Also, data are regularly emitted regarding the status of the pool (e.g., total number of workers, number of allocated workers, number of unallocated workers) and of the queue(s) for holding new tasks (e.g., the size of the queue(s)). These data are consumed and used as necessary to adjust the size of the pool.

In some embodiments, a target (maximum) processing time is defined to identify a desired maximum amount of time for completing a given task for a given task originator or for all task originators. In these embodiments, the time involved in completing a task may be measured from a first time at which the task was received to a second time at which the task was completed (and any necessary response was dispatched to the task's originator). As one alternative, the first time may identify the time at which a worker was assigned to the task. Also, a wait time may be defined to measure the amount of time, if any, that the task waits (e.g., in queue) for a worker to be assigned to it.

In some embodiments, task originators are partitioned and, for each originator, a separate ledger is maintained to identify tasks submitted by the originator and assigned to an available worker in the worker pool. Ledgers for different task originators are stored on different computer systems within a distributed computing system, although multiple originators' ledgers may be stored on the same computer system. The workers assigned to a given originator's tasks, however, may be hosted by any of the distributed computer systems participating in the worker pool.

In some implementations, entries in a task originator's ledger are sorted (e.g., by the times at which the originator's tasks were received). Because a given worker may terminate prematurely with or without having completed its assigned task (e.g., due to a processing error or lack of necessary resources), entries that are older than the target processing time may be periodically expunged.

DETAILED DESCRIPTION

Figure 1:
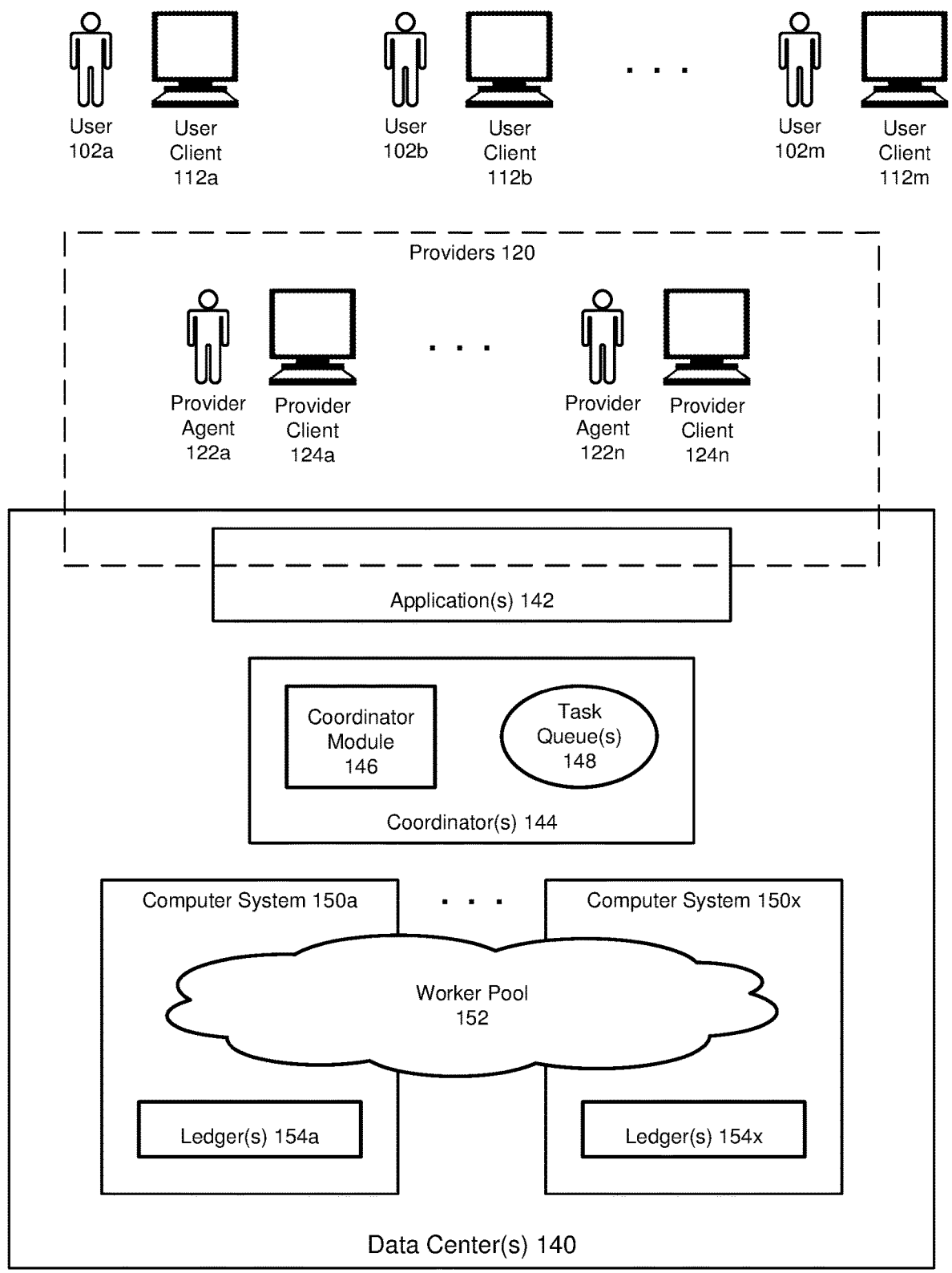
FIG. 1 is a block diagram depicting a computing environment in which a pool of worker entities is operated and managed in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system and method are provided for operating and managing a distributed pool of workers or worker entities (e.g., processes, threads) for performing computer operations required to complete various tasks. In these embodiments, the system includes a distributed computing environment comprising multiple computers operating within one or more data centers, each of which hosts a subset or portion of the workers participating in the pool. Tasks are submitted or initiated by multiple different users, businesses, governmental entities, non-profits, and/or other organizations, which are collectively termed "originators" or "task originators" herein.

The size of the pool (i.e., the number of workers included in the pool) may be adjusted periodically to meet task originators' demands (i.e., by increasing the number of workers) or conserve computing resources (i.e., by decreasing the number of workers). Data or metadata regarding the pool may be regularly or periodically collected to facilitate appropriate adjustments.

Individual originators may be assigned corresponding limits on the maximum number of workers that may be concurrently working on tasks submitted by the originators. Different originators may be assigned different limits, which may change over time. Also, when a new task arrives from a given originator and (a) no idle workers are available or (b) the maximum number of workers are already employed on tasks from that originator, the new task will be placed in a queue (or other data structure) to await availability of a worker. If, however, the queue in which the new task would be stored is full, the task may be rejected and a suitable message dispatched to the originator.

In some embodiments, a global or system-wide ledger is maintained for each task originator, which is used to track how many tasks from that originator are currently being processed or, in other words, how many workers are currently working on tasks received from the originator. For example, a new entry may be made in an originator's ledger upon receipt of a new task from the originator or upon assignment of a worker to the task, and may be removed from the ledger when the task is complete. In order to eliminate obsolete entries from a ledger, which may result from premature termination of a given worker (and cause an inaccurate count of the number of tasks currently being processed for the corresponding originator), entries that are older than a target (maximum) processing time may be automatically purged. Originators' ledgers may be partitioned so that different computers within the system host different ledgers, thereby distributing the processing involved in maintaining them.

FIG. 1 is a block diagram depicting a computing environment in which a pool of worker entities is operated and managed, according to some embodiments.

In the environment of FIG. 1, an organization operates one or more data centers 140 that host applications and/or services for use by internal and/or external entities. More particularly, data center 140 hosts applications 142, each of which is used (e.g., subscribed to) by any number of providers 120 to interact with end users 102a-102m, which access the applications via clients 112a-112m. Provider agents 122a-122n are available to assist end users 102 via provider clients 124a-124n. Providers 120 (e.g., provider agents 122) may also interact with data center 140 and/or the organization or organizations that operate data center(s) 140.

End user clients 112 are coupled to data center 140 and access the physical and/or virtual computers that host the applications via any number and type of communication links. For example, some clients 112 may execute installed software for accessing any or all applications; this software may be supplied by providers 120 and/or data center 140. Other clients 112 may execute browser software that communicates with web servers that are associated with and/or that host applications 142. The web servers may be operated by data center 140 and/or individual providers.

In some implementations, a client 112 may access data center 140 and applications 142 directly (e.g., via one or more networks such as the Internet); in other implementations, a client 112 may first connect to a provider 120 (e.g., a website associated with a particular provider) and be redirected to data center 140 and an application 142. In yet other implementations, one or more applications 142 may execute upon computer systems operated by a provider 120.

End users 102 use applications 142 in the context of particular providers. In other words, each user session with an application is associated with at least one provider 120. The context may be set when an end user is redirected to data center 140 from the corresponding provider's site, when the end user logs in using credentials provided by the provider, or in some other way.

Tasks may be submitted to data center 140 by providers 120 (via provider clients 124 and/or other entities), user clients 112, and/or other entities within or without data center 140. For example, in some embodiments, tasks may include customer service requests regarding application(s) 142 and/or data associated with the applications, and may be originated by users 110 and/or provider agents 122.

Besides application(s) 142, data center 140 includes one or more coordinator(s) 144, multiple computer systems 150 (e.g., computer systems 150a-150x), and one or more worker pools 152. A coordinator 144 is a physical or virtual computer that manages or assists the execution of tasks by workers in worker pool 152. For example, coordinator 144 may receive new tasks, store them if necessary (in task queue(s) 148), and dispatch them to workers on computer systems 150.

In the environment of FIG. 1, coordinator module 146 of coordinator 144 manages the receipt, storage, and dispatch of tasks to workers, and may have other duties as well. For example, the coordinator module may receive and maintain data regarding worker pool 152 (e.g., total number of workers in the pool, number of workers currently available, location of available workers (e.g., which computer system 150)), may enforce per-originator limits on how many tasks may be processed simultaneously, may manage task queue(s) 148, may maintain ledgers 154 (described below), etc.

A task queue 148 may store tasks that are received at data center while worker pool 152 is devoid of idle workers and/or may store tasks received from originators that have reached their assigned maximum number of concurrent tasks. In some embodiments, different queues are employed for these two situations (e.g., separate per-originator queues for the latter situation), but in other embodiments all queued tasks may reside in a single queue (or other data structure).

Each computer system 150 includes some or all traditional resources (e.g., processors, communication interface(s), primary and/or secondary data storage), which are not depicted in FIG. 1, hosts ledger(s) 154, and also hosts a portion of the workers that constitute worker pool 152. As described previously, worker pool 152 comprises worker entities that handle incoming tasks by performing computer operations dictated by the tasks (e.g., to update data, to copy or move data, to initiate communications, to generate a report).

Ledgers 154 (i.e., ledgers 154a-154x) include individual ledgers (or separate portions of a common ledger) for each task originator that submits one or more tasks to data center 140. In some implementations, a given originator's ledger is stored on a single computer system 150, possibly in common with other originators' ledgers, but tasks submitted by the given originator may be handled by workers executing on any of the multiple computer systems. In other implementations, ledgers 154 are stored on computer systems separate from computer systems 150.

A ledger 154 may be maintained by coordinator 144 and/or the computer system 150 on which the ledger resides. Therefore, either of these entities may create a new ledger entry when a new task from the corresponding originator is received or is assigned to a worker in a worker pool 152, and may delete the entry when the task is complete. Either entity may also periodically purge obsolete tasks. Yet further, either entity may purge entire ledgers that have been empty for a threshold period of time, thereby reclaiming additional resources.

In some embodiments, a task may be deemed obsolete, or stale, after it remains in a ledger for an amount of time that is based on a predetermined "target processing time." The target processing time (or TPT) in these embodiments is a measure of time within which the operator of data center 140 wishes to complete processing of a majority (or particular percentage) of tasks submitted to worker pool 152. For example, empirical statistics may be consulted to determine how much time has been historically required to complete a specified percentage (e.g., 75%, 90%) of tasks over some period of time. That value may be adopted as, or modified to yield, the target processing time or TPT.

When a new entry is added to an originator's ledger to record a new task from that originator, a timestamp is stored as part of the entry to indicate the time it was received or assigned to a worker. Identifiers of the task and/or the assigned worker may also be stored. Later, when a coordinator 144 (or other entity) determines that the entry is older than the TPT, or some period of time related to the target processing time (e.g., some multiple of TPT, TPT plus a constant), the entry may be purged. In some implementations, when the age of an entry exceeds the target processing time, it may be assumed that the assigned worker was prematurely terminated or aborted the task for some reason. However, in other implementations the worker to which the task was assigned may be examined to determine whether the task is still being processed (in which case the purge may be postponed).

When a computer system 150 is to be taken offline (e.g., for maintenance, upgrade, or replacement), it is placed in a condition in which it (its workers) finish processing assigned tasks, but no new tasks are assigned. When the existing tasks are completed, all ledgers stored on the system are copied to another computer system 150 or a replacement computer system.

Figure 2A:
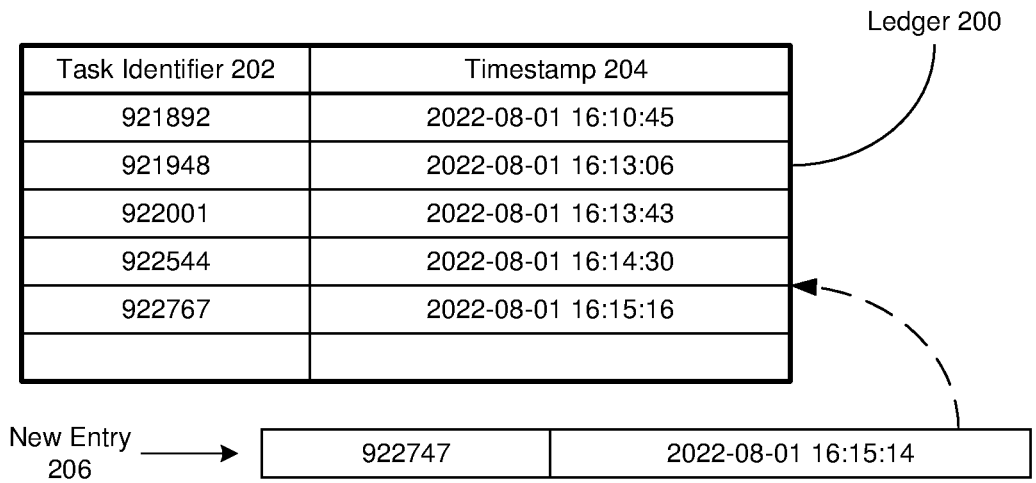
FIGS. 2A-B illustrate a ledger for tracking tasks associated with a task originator, in accordance with some embodiments.
Figure 2B:
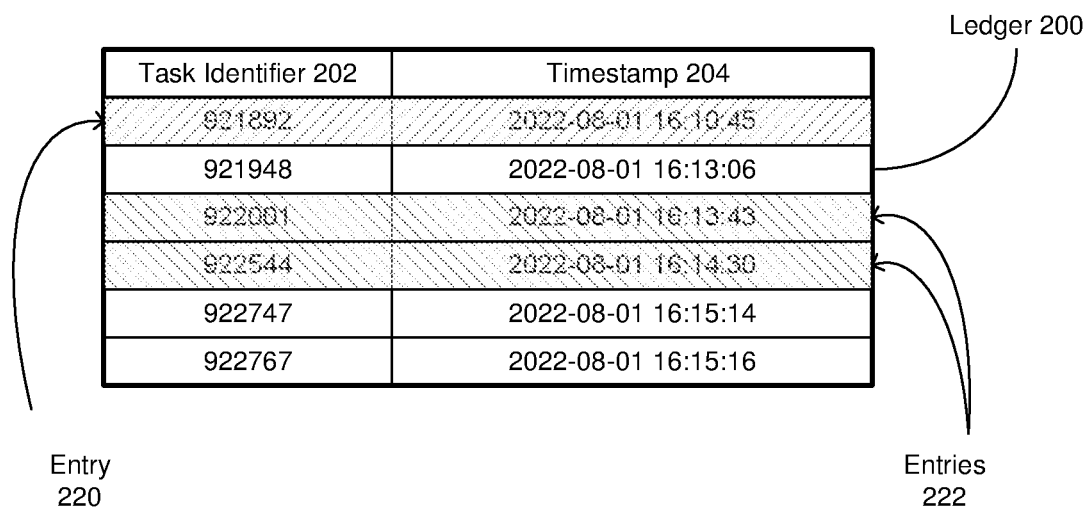

FIGS. 2A-B illustrate a ledger for tracking tasks associated with a particular task originator, according to some embodiments.

In these embodiments, ledger 200 includes one entry for each task that was received from the task originator and assigned to a worker, and that has not yet completed. In particular, each entry includes an identifier of the task (i.e., task identifier 202) and a timestamp 204 that identifies when the task was received or when it was assigned to a worker.

In some implementations other information may be stored, such as an identifier of the worker. However, depending on the computing environment, millions of tasks may be received on a daily or even hourly basis, and so the less data that must be written for each entry, the faster the entry can be added to the ledger. In embodiments in which vast numbers of tasks are processed, a timestamp may record the time with any desired precision (e.g., to the millisecond).

FIG. 2A demonstrates insertion into ledger 200 of new entry 206, for a task having the identifier 922747. It should be noted that because one global ledger is maintained for each task originator, at one computer system, while the originator's tasks may be distributed across multiple systems, an entry for one task received at a given time may be received at the ledger after one or more entries for later tasks have already been entered. FIG. 2A demonstrates that entries may be sorted (e.g., by timestamp or task identifier) automatically as they are recorded or may be sorted at some other time (e.g., when obsolete entries are purged).

FIG. 2B shows that new entry 206 was recorded, and also reflects removal of entry 220 because the entry has become obsolete. For example, if the target processing time is five minutes, and the current time is later than 2022-08-01 16:15:45, entry 220 may be removed upon the assumption that the worker that was handling the task has terminated and/or that the task was abandoned.

FIG. 2B also demonstrates removal of entries 222 because their tasks have been completed. When a worker finishes an assigned task, it may alert coordinator 144 and/or its host computer 150, one of which will update the originator's ledger accordingly.

Figure 3:
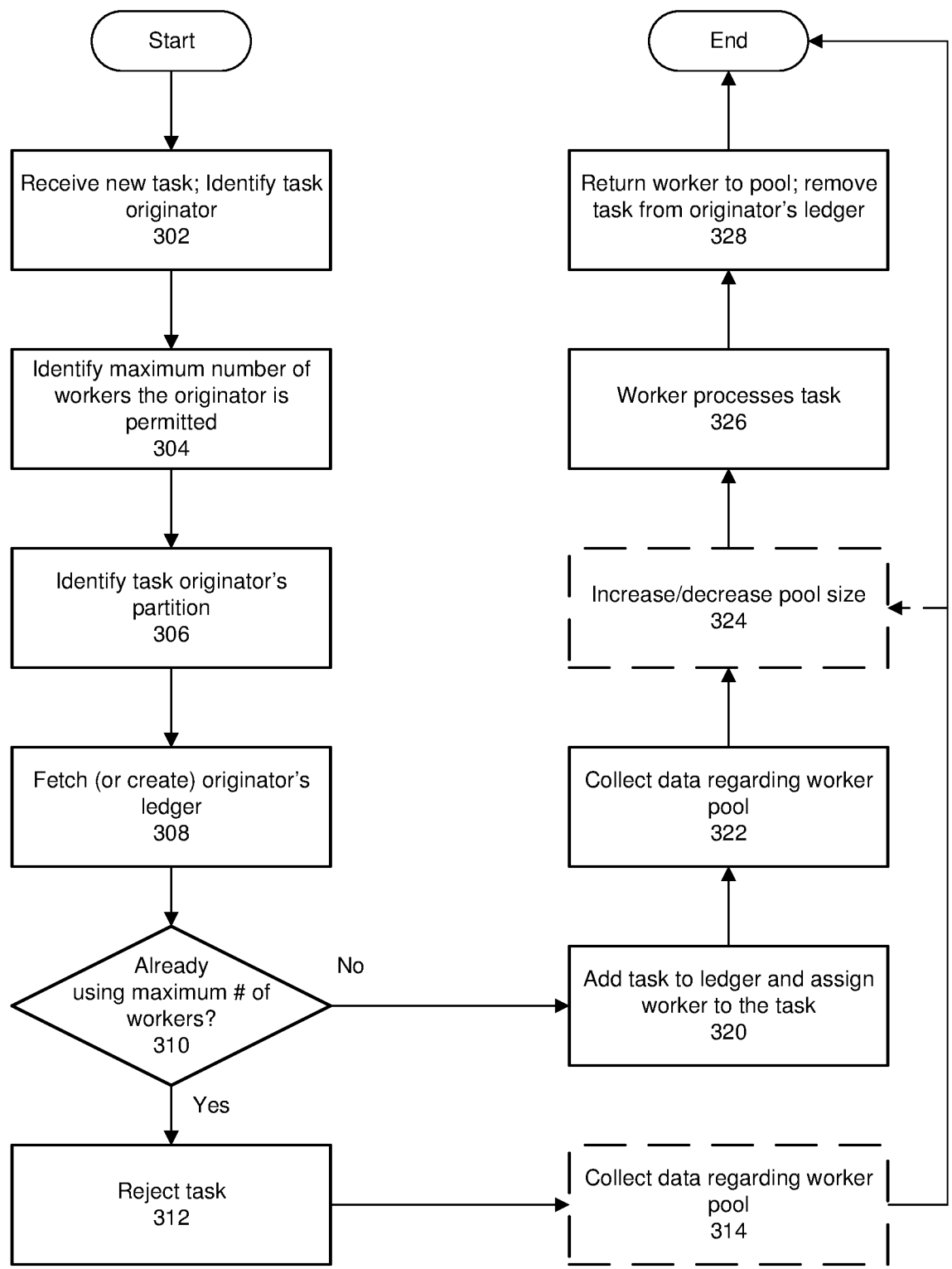
FIG. 3 is a flowchart demonstrating a method of operating and managing a pool of worker entities, in accordance with some embodiments.

FIG. 3 is a flowchart demonstrating a method of operating and managing a pool of worker entities, according to some embodiments. One or more of the operations may be omitted, repeated, and/or performed in a different order. Accordingly, the specific arrangement of steps shown in FIG. 3 should not be construed in a manner that limits the scope of the embodiments.

In operation 302, a new task is received at a data center that maintains a distributed pool of workers for handling and executing tasks. For example, the task may be received at coordinator 144 in the computing environment of FIG. 1. When the task is received, the originator of the task is identified via the communication that conveyed the task and/or in some other way (via metadata that accompanies the task).

In operation 304, the coordinator (or other entity) that receives the task identifies the maximum number of workers that may be concurrently allocated to the originator's tasks or, equivalently, the maximum number of tasks from the originator that may be processed simultaneously. By limiting the resources (i.e., workers) that can be dedicated to one task originator, the system prevents a single originator from monopolizing the resources or unfairly depriving other originators of access to workers for their tasks.

In some implementations, a default maximum number of workers/tasks is enforced for some or all task originators. In other implementations, different originators have different maximums. For example, originators such as providers 120 in the environment of FIG. 1 may subscribe to a service of data center 140 that enables them to submit tasks to worker pool 152. Based on the configurations of their subscriptions, different providers may be assigned different maximum values. The coordinator may cache these values and/or store them with the originators' ledgers.

In operation 306, the coordinator identifies the partition (within the distributed computing system) that stores or that will store the task originator's ledger. Originators may be partitioned based on an identifier assigned by the system or the data center or based on some other information. For example, such an identifier may be hashed or otherwise manipulated to yield a partition number.

In operation 308, a copy of the task originator's ledger is fetched from the identified partition or, if the originator is new, a ledger is created for the originator.

In operation 310, the coordinator refers to the originator's ledger to determine whether the originator is currently using the maximum number of workers it is permitted to use. Illustratively, the coordinator may simply determine the number of entries in the ledger and compare that value to the allowed maximum. If the originator is not using the maximum allowed, the method advances to operation 320. In some implementations, if it appears that the system is already processing the maximum number of concurrent tasks for the originator, the system may attempt to purge the ledger of obsolete entries for verification.

If the originator is using the maximum number of workers it is permitted to engage at one time, in operation 312 the new task is rejected, and an appropriate message may be returned to the originator. As one alternative, a queue or other data structure specific to the originator or used for multiple originators may be created, and the task may be queued until the number of workers allocated to the originator's tasks falls below the maximum. Until that time, all other new tasks received from the originator will be added to the queue.

In optional operation 314, data regarding the operating environment is collected at a central location (e.g., coordinator 144 of data center 140 of FIG. 1). For example, each computer system that hosts one or more workers participating in the worker pool may report how many idle and/or active workers it currently has, the total number of workers it hosts (i.e., idle and active), how many workers are assigned to tasks received from one or more particular originators, and/or other information. This allows the coordinator to ascertain how many workers are idle or engaged. The computer systems may periodically offer this information and/or the coordinator may poll the computer systems for the information. The coordinator may also determine the size of one or more queues used to store tasks that are awaiting assignment to workers. After operation 314, the method may end or may advance to operation 324.

In operation 320, the new task is added to the task originator's ledger and the task is assigned to a worker. The coordinator may attempt to balance the loads on the computer systems that host workers, and so the coordinator may select a computer system and forward the task to it.

In operation 322, data regarding the operating environment is collected as described above with regard to operation 314.

In optional operation 324, the size of the worker pool may be adjusted if determined necessary or appropriate. For example, if tasks regularly take longer to complete than the target processing time, the pool may be expanded by instructing one or more computer systems to instantiate more workers. As another example, if the worker pool is empty of idle workers (i.e., all workers in the pool are processing tasks), possibly for a minimum period of time or on repeated occasions, the pool may be expanded to provide more workers. Conversely, if the pool has an excess of idle workers, possibly for some minimum period of time, the pool may be reduced in size by instructing one or more of the computer systems to terminate one or more workers.

Moreover, the coordinator may periodically determine an optimal or appropriate pool size (i.e., number of workers). For example, the coordinator may attempt to maintain an absolute minimum number of idle workers, or may attempt to retain a number of idle workers as a percentage of the total number of workers (e.g., to accommodate a sudden influx of new tasks). Also, or instead, the coordinator may maintain the size of the pool in accordance with a schedule, which may be based on office hours of the time zone in which the data center is located (i.e., to use a larger pool during work hours), historical patterns of task arrivals, and/or other criteria. Any or all of these factors may be employed in combination.

In operation 326, the assigned worker processes the task. This may involve retrieving data desired by the task originator, storing or changing data, initiating a communication, and/or other activity.

Upon completion of the task, in operation 328 the worker is returned to the worker pool and the corresponding entry is removed from the originator's ledger. The ledger update may be performed by the coordinator or the computer system on which the ledger is stored. In some embodiments, the coordinator updates a locally stored copy of the ledger then writes it to the appropriate computer system. The method ends after operation 328.

In some embodiments, when a task is approved for processing by a worker (e.g., at or prior to operation 320), if there are no idle workers in the pool the task is queued to wait for an available worker. Tasks from multiple originators may be queued together, with individual tasks being removed and assigned to an available worker in a first-in first-out manner. When the queue reaches a maximum size, new tasks are rejected until its size is reduced below the maximum.

Further, in some implementations, a particular task originator may be limited in the number of tasks that may be queued, not just the number of tasks that may be processed concurrently. This safeguard may help avoid rejecting other originators' tasks due to misbehavior or the submission of excessive numbers of tasks by the particular originator and a resulting full task queue.

Figure 4:
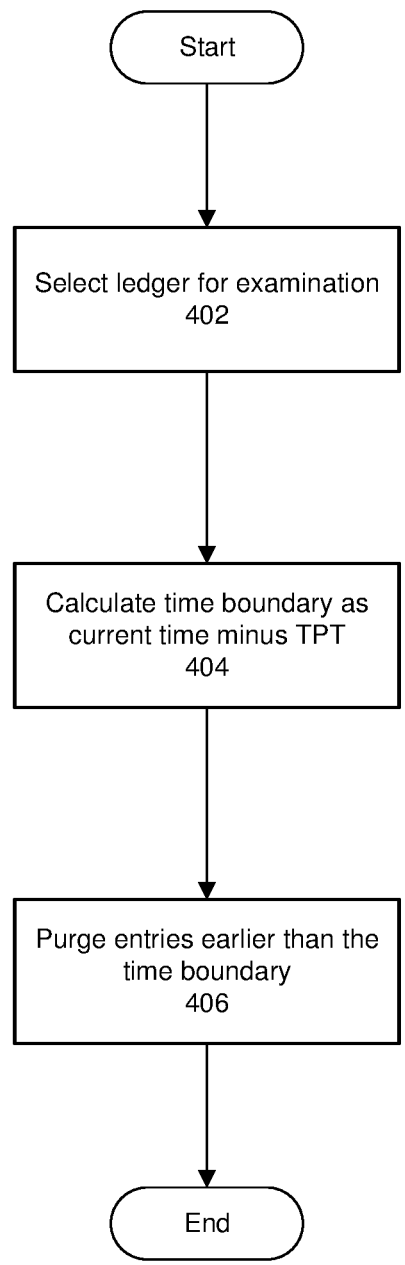
FIG. 4 is a flowchart demonstrating a method of periodically purging entries in a ledger, in accordance with some embodiments.

FIG. 4 is a flowchart demonstrating a method of periodically purging entries in a ledger, according to some embodiments. One or more of the operations may be omitted, repeated, and/or performed in a different order. Accordingly, the specific arrangement of steps shown in FIG. 4 should not be construed in a manner that limits the scope of the embodiments.

In operation 402, a ledger is selected for examination and purging of obsolete or stale entries, or even for deletion if it has been empty for a threshold period of time. In some implementations, a ledger may be selected for examination on a recurring basis, perhaps in conjunction with or as a result of a regular activity. For example, every time a ledger is updated to remove one or more entries because the associated task(s) completed (e.g., as in operation 328 of the method of FIG. 3), or every time a coordinator examines a ledger to determine whether the maximum permitted number of workers are currently working on the associated originator's tasks, the ledger may be examined to determine if one or more obsolete entries can be deleted. A given originator's ledger may be deleted if the threshold period of time passes without receipt of a new task.

In operation 404, the current time is noted and the applicable target processing time or TPT is subtracted from the current time. The resulting time value identifies a time boundary separating obsolete entries from non-obsolete entries.

In operation 406, all entries (if any) that have receipt timestamps earlier than the time boundary are purged from the ledger. The method then ends.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method, comprising:
   configuring a distributed computing system to comprise a pool of electronic worker entities for performing computer operations;
   electronically receiving, at the distributed computing system, a task involving multiple computer operations from a first originator among multiple task originators;
   retrieving from electronic memory a maximum number of concurrent tasks permitted for the first originator;
   retrieving a first electronic ledger corresponding to the first originator, wherein the first electronic ledger identifies tasks from the first originator that were assigned to the pool of workers and that have not finished processing;
   when a number of tasks from the first originator that were assigned to the pool of workers and that have not finished processing is less than the maximum number of concurrent tasks permitted for the first originator:
     adding to the first electronic ledger an entry corresponding to the task; and
     assigning the task to a first worker within the pool of workers; and
   periodically pruning the first electronic ledger to conserve computing resources by:
     searching the first electronic ledger for entries older than a target processing time; and
     deleting from the first electronic ledger one or more entries older than the target processing time.

2. The method of claim 1, wherein:
   the target processing time is calculated as a time period historically sufficient to allow a target percentage of tasks to complete processing by workers in the pool of workers.

3. The method of claim 1, wherein:
   each entry in the first electronic ledger comprises a timestamp identifying when a corresponding task was received or when the corresponding task was assigned to a worker in the pool of workers.

4. The method of claim 1, further comprising, upon completion of the task by the first worker:
   deleting a corresponding entry from the first electronic ledger.

5. The method of claim 1, further comprising:
   collecting information regarding the pool of workers;
   determining whether the pool of workers should be increased or decreased in size; and
   automatically adjusting a size of the pool of workers if it is determined that the pool of workers should be increased or decreased in size.

6. The method of claim 1, further comprising:
   when the number of tasks from the first originator that were assigned to the pool of workers and that have not finished processing is greater than the maximum number of concurrent tasks permitted for the first originator:
     rejecting the task; or
     queuing the task until the number of tasks from the first originator that were assigned to the pool of workers and that have not finished processing is less than the maximum number of concurrent tasks permitted for the first originator.

7. The method of claim 1, further comprising:
   when the pool of workers is empty of idle workers, queuing the task until the pool comprises at least one idle worker.

8. A non-transitory computer-readable medium storing instructions that, when executed by a processor, cause the processor to perform a method comprising:
   configuring a distributed computing system to comprise a pool of electronic worker entities for performing computer operations;
   electronically receiving, at the distributed computing system, a task involving multiple computer operations from a first originator among multiple task originators;
   retrieving from electronic memory a maximum number of concurrent tasks permitted for the first originator;
   retrieving a first electronic ledger corresponding to the first originator, wherein the first electronic ledger identifies tasks from the first originator that were assigned to the pool of workers and that have not finished processing;
   when a number of tasks from the first originator that were assigned to the pool of workers and that have not finished processing is less than the maximum number of concurrent tasks permitted for the first originator:
     adding to the first electronic ledger an entry corresponding to the task; and
     assigning the task to a first worker within the pool of workers; and
   periodically pruning the first electronic ledger to conserve computing resources by:
     searching the first electronic ledger for entries older than a target processing time; and
     deleting from the first electronic ledger one or more entries older than the target processing time.

9. The non-transitory computer-readable medium of claim 8, wherein:
   the target processing time is calculated as a time period historically sufficient to allow a target percentage of tasks to complete processing by workers in the pool of workers.

10. The non-transitory computer-readable medium of claim 8, wherein:
    each entry in the first electronic ledger comprises a timestamp identifying when a corresponding task was received or when the corresponding task was assigned to a worker in the pool of workers.

11. The non-transitory computer-readable medium of claim 8, wherein the method further comprises, upon completion of the task by the first worker:

deleting a corresponding entry from the first electronic ledger.

12. The non-transitory computer-readable medium of claim 8, wherein the method further comprises:
collecting information regarding the pool of workers;
determining whether the pool of workers should be increased or decreased in size; and
automatically adjusting a size of the pool of workers if it is determined that the pool of workers should be increased or decreased in size.

13. The non-transitory computer-readable medium of claim 8, wherein the method further comprises:
when the number of tasks from the first originator that were assigned to the pool of workers and that have not finished processing is greater than the maximum number of concurrent tasks permitted for the first originator:
rejecting the task; or
queuing the task until the number of tasks from the first originator that were assigned to the pool of workers and that have not finished processing is less than the maximum number of concurrent tasks permitted for the first originator.

14. The non-transitory computer-readable medium of claim 8, wherein the method further comprises:
when the pool of workers is empty of idle workers, queuing the task until the pool comprises at least one idle worker.

15. A system, comprising:
a distributed computing system comprising multiple computers collectively hosting a pool of workers, each computer comprising one or more processors and memory storing instructions for execution by the one or more processors; and
a coordinator comprising at least one processor and memory storing instructions that, when executed by the at least one processor, cause the coordinator to:
electronically receive, at the distributed computing system, a task involving multiple computer operations from a first originator among multiple task originators;
retrieving from electronic memory a maximum number of concurrent tasks permitted for the first originator;
retrieve a first electronic ledger corresponding to the first originator from a first computer among the multiple computers, wherein the first electronic ledger identifies tasks from the first originator that were assigned to the pool of workers and that have not finished processing;
when a number of tasks from the first originator that were assigned to the pool of workers and that have not finished processing is less than the maximum number of concurrent tasks permitted for the first originator:
add to the first electronic ledger an entry corresponding to the task; and
assign the task to a first worker within the pool of workers; and
periodically prune the first electronic ledger to conserve computing resources by:
searching the first electronic ledger for entries older than a target processing time; and
deleting from the first electronic ledger one or more entries older than the target processing time.

16. The system of claim 15, wherein:
the target processing time is calculated as a time period historically sufficient to allow a target percentage of tasks to complete processing by workers in the pool of workers.

17. The system of claim 15, wherein:
each entry in the first electronic ledger comprises a timestamp identifying when a corresponding task was received or when the corresponding task was assigned to a worker in the pool of workers.

18. The system of claim 15, wherein the coordinator memory further stores instructions that, when executed by the at least one processor of the coordinator, cause the coordinator to:
delete a corresponding entry from the first electronic ledger.

19. The system of claim 15, wherein the coordinator memory further stores instructions that, when executed by the at least one processor of the coordinator, cause the coordinator to:
collect information regarding the pool of workers;
determine whether the pool of workers should be increased or decreased in size; and
automatically adjust a size of the pool of workers if it is determined that the pool of workers should be increased or decreased in size.

20. The system of claim 15, wherein the coordinator memory further stores instructions that, when executed by the at least one processor of the coordinator, cause the coordinator to:
when the number of tasks from the first originator that were assigned to the pool of workers and that have not finished processing is greater than the maximum number of concurrent tasks permitted for the first originator:
reject the task; or
queue the task until the number of tasks from the first originator that were assigned to the pool of workers and that have not finished processing is less than the maximum number of concurrent tasks permitted for the first originator.

21. The system of claim 15, wherein the coordinator memory further stores instructions that, when executed by the at least one processor of the coordinator, cause the coordinator to, further comprising:
when the pool of workers is empty of idle workers, queue the task until the pool comprises at least one idle worker.

* * * * *